United States Patent [19]
Hughes et al.

[11] Patent Number: 5,708,706
[45] Date of Patent: Jan. 13, 1998

[54] CONNECTOR LEAD FOR A TRANSCEIVER UNIT

[75] Inventors: Nevil John Hughes; Robert Clifford Newstead; Kevin John Yates, all of Surrey, England

[73] Assignee: Nokia Mobile Phones Limited, Salo, Finland

[21] Appl. No.: 592,580

[22] Filed: Jan. 26, 1996

[30] Foreign Application Priority Data

Jan. 28, 1995 [GB] United Kingdom .................. 9501715

[51] Int. Cl.$^6$ .......................... H04M 1/100; H01R 13/60
[52] U.S. Cl. .................. 379/446; 379/455; 379/447; 379/438; 379/450; 439/528
[58] Field of Search .................. 379/446, 454, 379/455, 426, 447, 450, 438, 428; 455/89, 90; 224/929, 930; 439/528

[56] References Cited

U.S. PATENT DOCUMENTS

| | | | |
|---|---|---|---|
| 4,057,757 | 11/1977 | Darden, Jr. ............... | 224/930 |
| 5,170,494 | 12/1992 | Levanto ................... | 455/90 |
| 5,176,343 | 1/1993 | Cheney, II et al. ........ | 248/51 |
| 5,189,632 | 2/1993 | Paajanen et al. .......... | 364/705.05 |
| 5,200,997 | 4/1993 | Leman ..................... | 379/428 |
| 5,214,309 | 5/1993 | Saarnimo .................. | 257/712 |
| 5,229,701 | 7/1993 | Leman et al. .............. | 320/2 |
| 5,253,146 | 10/1993 | Halttunen et al. .......... | 361/784 |
| 5,265,158 | 11/1993 | Tattari ................... | 379/433 |
| 5,271,056 | 12/1993 | Pesola et al. ............. | 379/58 |
| 5,361,459 | 11/1994 | Hyvonen et al. ............ | 24/35 |

FOREIGN PATENT DOCUMENTS

| | | | |
|---|---|---|---|
| 570325 | 11/1993 | European Pat. Off. ........ | 455/89 |
| 219718 | 9/1987 | Japan ..................... | 455/89 |

*Primary Examiner*—Jack Chiang
*Attorney, Agent, or Firm*—Perman & Green, LLP

[57] ABSTRACT

Mobile telephone apparatus comprises a transceiver unit (10) having a handset cradle (12), signal antenna (14) and ports (16–24) for the connection of a handset, external loudspeaker/microphone, power supply etc. A power lead (26) for connecting the power supply port (24) of the apparatus to a cigarette lighter socket is stored when not in use by plugging the cigarette lighter adaptor (36) at one end of the lead (26) into a dummy socket (44) formed in a housing (42) which is detachably connected to the transceiver unit (10). The lead (26) is combined with a carrying strap (28), one end of which is connected to the cigarette lighter adapter and the other end (30) of which is detachably connectable to a retaining slot (32) on the transceiver unit (10).

6 Claims, 1 Drawing Sheet

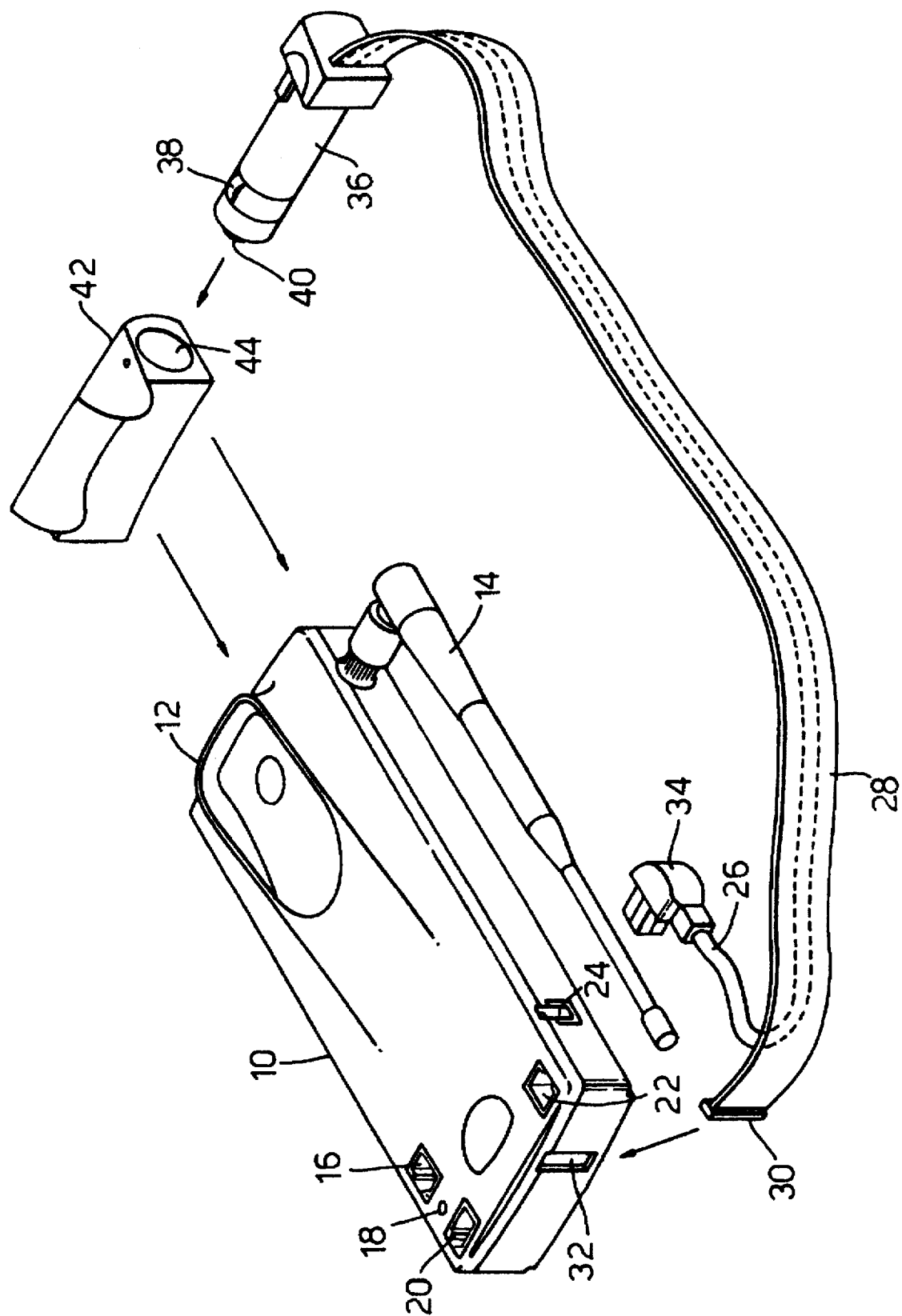

CONNECTOR LEAD FOR A TRANSCEIVER UNIT

BACKGROUND OF THE INVENTION

This invention relates to improvements in mobile telephones, and more particularly to improved arrangements for the management of connector leads forming part of mobile telephone apparatus.

Mobile telephone apparatus often includes a number of separate components, including battery packs, power and signal leads, carrying straps and the like. Users of the apparatus will not require the use of all such components all of the time, but it is important that such components are available when needed. Accordingly, it is desirable for means to be provided whereby all of the components can be kept together in a convenient manner. This can be achieved by the use of a suitable carrying case for the apparatus, however not all configurations of apparatus are suited to this. Even if a carrying case is provided for the apparatus, it is possible for components to be left out and to be unavailable when needed.

One example of a system component which is difficult to store conveniently with the main telephone apparatus is a power lead having a cigarette lighter adaptor at one end and a power connector at the other end. Such a lead serves the dual purpose of connecting the telephone apparatus to a cigarette lighter socket so as to provide power for the apparatus, and of connecting a rechargeable battery pack to a cigarette lighter socket for charging the battery.

SUMMARY OF THE INVENTION

In accordance with the invention there is provided mobile telephone apparatus comprising a transceiver unit and a connector lead, said lead including a first end having first connector means for connection to a port of the transceiver unit and a second end having second connector means for connection to other apparatus, said transceiver unit including housing means adapted to receive said second connector means when said connector lead is not in use.

In one embodiment of the invention said second connector means comprises a cigarette lighter adaptor and said housing includes a dummy cigarette lighter socket. The cigarette lighter adaptor may include retaining means for positively engaging said dummy socket.

In the preferred embodiment of the invention, said connector lead is combined with a carrying strap, said carrying strap having a first end adapted to be connected to said transceiver unit and having a second end connected to said second connector means.

Preferably, the housing is located at a first end of said transceiver unit, and said first end of said strap is connected to said transceiver unit at the second end thereof remote from said housing.

It is particularly preferred that the housing is detachable from said transceiver unit. Typically, the transceiver unit may include a handset cradle, said housing being attached to said transceiver unit adjacent said handset cradle and the housing being shaped to conform to the contours of said handset cradle.

BRIEF DESCRIPTION OF THE DRAWING

FIG. 1 is an embodiment of the invention will now be described, by way of example only, with reference to the accompanying drawing which is a perspective view of mobile telephone apparatus incorporating a combined carrying strap and power lead in accordance with the present invention.

DETAILED DESCRIPTION OF THE INVENTION

The invention will be described herein FIG. 1 with reference to mobile telephone apparatus of the type intended particularly for in-car use, of the type comprising a transceiver unit and a separate handset or hands-free mouthpiece and earpiece arrangements. However, it will be appreciated that the invention may also be applicable to other types of mobile telephone apparatus.

Referring now to the drawing, mobile telephone apparatus comprises a transceiver unit 10, which includes a sculpted cradle 12 for a handset (not shown), a signal antenna 14, a handset connector port 16, a microphone port 18, a loudspeaker port 20, an M-bus port 22 and a power connector port 24. The apparatus is powered by an external power source (not shown) which may be connected to the power connector port 24.

Typically, the apparatus might be powered from a battery pack, a cigarette lighter socket or a mains power adaptor. The apparatus requires leads for connection to such power sources. Battery packs and mains adaptors may have integral leads, however connection to a cigarette lighter socket requires a separate lead having a power connector at one end for connection to the transceiver power connector port 24 and a cigarette lighter adaptor at the other end for connection to the cigarette lighter socket. Such a lead can also be used to connect a rechargeable battery pack (not shown) to a cigarette lighter socket for charging.

In accordance with the preferred form of the invention, the lead 26 for connection to a cigarette lighter socket (not shown) is incorporated into a detachable carrying strap 28 for the transceiver unit 10. A first end 30 of the strap 28 is adapted to engage a retaining slot 32 formed at one end of the transceiver unit 10, and the lead 26 has a corresponding first end terminated by a power connector 34 adapted to engage the power connector port 24. The second ends of the lead 26 and strap 28 are connected to a cigarette lighter adaptor 36, the lead 26 being connected to the usual electrical terminals 38, 40 of the adaptor 36.

The telephone apparatus also includes a housing 42, including a dummy cigarette lighter socket 44, located at the opposite end of the transceiver unit 10 from the strap retaining slot 32, adjacent the handset cradle 12. The housing 42 might be formed as part of the transceiver unit 10. However, in this example the housing 42 comprises a detachable unit which is clipped to the transceiver unit 10 by any suitable means, such as respective interengaging formations (not shown) on the housing 42 and on the transceiver unit 10. The housing 42 is sculpted to match the contours of the handset cradle 12. The cigarette lighter adaptor 36 also includes a retaining clip 46 allowing the adaptor 36 to positively engage the dummy socket 44.

When the cigarette lighter adaptor 36 is not required for supplying power to the apparatus, it is located in the dummy socket 44, the first end 30 of the strap 28 being located in the retaining slot 32, such that the combined lead 26 and strap 28 may function as a carrying strap. In this condition the power connector 34 may be connected to the power connector port 24, or may be removed from the port 24 to allow an alternative power source to be connected thereto. When the apparatus is to be connected to a cigarette lighter socket, the cigarette lighter adaptor 36 is removed from the dummy socket 44 of the housing 42 and plugged into the socket from which power is to be received. If it is not already connected, the power connector 24 is also plugged into the power connector port 24.

If required, the combined lead 26 and strap 28 may be detached completely from the transceiver unit 10, and may then be used for charging a battery pack. The housing 42 may also be removed if required.

In an alternative embodiment of the invention (not illustrated), the lead 26 might remain separate from the strap 28. The second end of the strap 28 would then be connected to the transceiver by any suitable means and the lead 26, including the cigarette lighter adaptor 36, would simply be clipped to the transceiver unit 10 as a separate component. The adaptor 36 could still be stowed in a dummy socket as in the illustrated embodiment, and the remainder of the lead 26 clipped to the body of the transceiver unit 10 by any suitable means. The illustrated embodiment is preferred, however, since it is tidier and reduces the number of separable components of the apparatus.

The invention might also be applied to connector leads of types other than the cigarette lighter power adaptor illustrated, utilising housings and dummy sockets to suit the relevant connectors forming part of the lead in question.

What is claimed is:

1. Mobile telephone apparatus comprising a transceiver unit and a connector lead, said lead including a first end having first connector means for connection to a port of the transceiver unit and a second end having second connector means for connection to other apparatus, said transceiver unit including a socket for receiving said second connector means when said connector lead is not in use, said connector lead together with a strap forms a carrying strap, said carrying strap having a first end adapted to be connected to said transceiver unit and having a second end connected to said second connector means.

2. Mobile telephone apparatus as claimed in claim 1, wherein said second connector means comprises a cigarette lighter adaptor and said socket is a dummy cigarette lighter socket.

3. Mobile telephone apparatus as claimed in claim 2, wherein said cigarette lighter adaptor includes retaining means for positively engaging said dummy cigarette lighter socket.

4. Apparatus as claimed in claim 1, wherein said socket is located at a first end of said transceiver unit, and said first end of said strap is connected to said transceiver unit at a second end thereof remote from said socket.

5. Mobile telephone apparatus as claimed in claim 1, wherein said socket is included in a housing detachable from said transceiver unit.

6. Mobile telephone apparatus as claimed claim 5, wherein said transceiver unit includes a handset cradle, said housing is attached to said transceiver unit adjacent said handset cradle and said housing is shaped to conform to the contours of said handset cradle.

* * * * *